US011509683B2

(12) United States Patent
Vela et al.

(10) Patent No.: US 11,509,683 B2
(45) Date of Patent: *Nov. 22, 2022

(54) SYSTEM AND METHOD FOR SECURING A NETWORK

(71) Applicant: Booz Allen Hamilton Inc., McLean, VA (US)

(72) Inventors: Chelsea Vela, San Antonio, TX (US); Justin Hoffman, Boerne, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,917

(22) Filed: Jan. 14, 2022

(65) Prior Publication Data

US 2022/0141248 A1 May 5, 2022

Related U.S. Application Data

(63) Continuation of application No. 16/453,212, filed on Jun. 26, 2019, now Pat. No. 11,277,430.

(60) Provisional application No. 62/770,893, filed on Nov. 23, 2018.

(51) Int. Cl.
*H04L 9/40* (2022.01)

(52) U.S. Cl.
CPC ...... *H04L 63/1433* (2013.01); *H04L 63/1416* (2013.01); *H04L 63/1466* (2013.01)

(58) Field of Classification Search
CPC ............. H04L 63/1433; H04L 63/1416; H04L 63/1466

USPC .......................................................... 726/25
See application file for complete search history.

(56) References Cited

U.S. PATENT DOCUMENTS

| 7,315,801 B1 * | 1/2008 | Dowd | H04L 41/147 709/224 |
| 7,779,468 B1 * | 8/2010 | Magdych | H04L 63/14 709/224 |
| 8,464,346 B2 * | 6/2013 | Barai | H04L 63/1433 705/18 |

(Continued)

OTHER PUBLICATIONS

AlphaGo Zero: Learning from scratch, https://deepmind.com/blog/alphago-zero-learning-scratch/. (7 pages).

(Continued)

*Primary Examiner* — Badrinarayanan
*Assistant Examiner* — Badri Narayanan Champakesan
(74) *Attorney, Agent, or Firm* — Buchanan Ingersoll & Rooney PC

(57) ABSTRACT

A system for generating a cyber-attack to penetrate a network. The system includes an identification module configured to identify at least one vulnerability of the network by examining at least one of a node of the network, data transmission within the network, or data received from a cyber defense mechanism; a generation module configured to generate a cyber-attack based on the at least one vulnerability of the network, and a goal to be achieved by the cyber-attack. The system includes a penetration module configured to penetrate the network with the cyber-attack and determine an effectiveness rating of the penetration; and a feedback module configured to provide a feedback to the identification module based on at least the effectiveness rating of the penetration.

21 Claims, 5 Drawing Sheets

System For Generating A Cyber Exploit To Penetrate A Network

(56) References Cited

U.S. PATENT DOCUMENTS

| | | | |
|---|---|---|---|
| 8,490,196 B2* | 7/2013 | Lucangeli Obes | ........................... H04L 63/1433 726/25 |
| 8,844,044 B2* | 9/2014 | Kennedy | ................. H04L 41/22 713/188 |
| 10,270,798 B2* | 4/2019 | Zaffarano | ................ H04L 63/20 |
| 2003/0028803 A1* | 2/2003 | Bunker, V | .............. H04L 43/00 709/224 |
| 2005/0138426 A1* | 6/2005 | Styslinger | ........... H04L 63/0281 709/224 |
| 2013/0031635 A1* | 1/2013 | Lotem | ................. H04L 63/1433 726/25 |
| 2016/0248800 A1* | 8/2016 | Ng | .......................... G06Q 40/06 |
| 2016/0359872 A1* | 12/2016 | Yadav | ..................... H04L 63/20 |
| 2018/0365429 A1* | 12/2018 | Segal | .................... H04L 67/535 |
| 2019/0014141 A1* | 1/2019 | Segal | ................. H04L 63/1483 |
| 2019/0149572 A1* | 5/2019 | Gorodissky | ......... H04L 63/1475 726/25 |
| 2021/0273967 A1 | 9/2021 | Vela et al. | |

OTHER PUBLICATIONS

E. Raff et al., "Learning the PE Header, Malware Detection with Minimal Domain Knowledge", arXiv.org pre-print of ACM AlSec'17 manuscript No. (18 pages).

E. Raff et al., "Malware Detection by Eating a Whole EXE", arXiv:1710.09435v1 [stat.ML], Oct. 25, 2017. (13 pages).

* cited by examiner

FIG. 1: System For Generating A Cyber Exploit To Penetrate A Network

FIG. 2: Node Device Architecture Functions For Generating a Cyber Exploit

FIG. 3: System For Generating A Cyber Defense Mechanism To Secure A Network

FIG. 4: Node Device Architecture Functions For Generating A Cyber Defense Mechanism To Secure A Network.

SYSTEM AND METHOD FOR SECURING A NETWORK

STATEMENT REGARDING FEDERALLY-SPONSORED RESEARCH OR DEVELOPMENT

This invention was made in the performance of a Cooperative Research and Development Agreement with the Department of the Air Force. The Government of the United States has certain rights to use the invention.

FIELD

Aspects of the present disclosure provide systems and methods for securing a network.

BACKGROUND INFORMATION

Almost all networks, regardless of physical or logical architecture encounter information security challenges. In some cases, these challenges are even more pronounced as cyber-attacks on networks are becoming more complex than ever before and adversaries are becoming increasingly sophisticated and creative in how they exploit cyber vulnerabilities.

Known techniques for thwarting cyber-attacks that compromise a network involve penetration testing and network defense analysis. These techniques include cyber analysts manually sifting through massive amounts of historical data and known attack codes to emulate specific cyber threats and/or cyber defenses. Therefore, these known techniques are expensive and time-consuming processes, and merely result in cyber defenses that are limited to the knowledge and resources of the cyber analysts. For example, when cyber analysts are aware of previously detected attack signatures, they merely create rules that prevent the same type of event from occurring again.

One of the many disadvantages with these known cyber analyst driven techniques is that they do not scale with the shortage of cyber talent and are very sluggish in anticipating new attacks. To overcome these disadvantages, there has been a recent push to incorporate Machine Learning/Artificial Intelligence techniques into cyber products, tools, and technologies. However, these techniques consistently produce high false positive rates. That is, these techniques produce a remarkably high number of alerts, which cause cyber analysts to spend a significant amount of time investigating the alerts without finding anything of significance.

Additionally, known products that attempt to automate techniques for penetration testing and network defense analysis are limited in capabilities, only covering select scenarios instead of covering more comprehensive, complex adversarial behaviors and tactics. These known products still require user input and therefore remain limited by the knowledge and training of cyber analysts. This presents many technical challenges regarding the effectiveness of the above described known products and techniques. Aspects of the present disclosure provide technical solutions to the previously described technical challenges.

SUMMARY

A system for generating a cyber-attack to penetrate a network is disclosed. The system includes an identification module configured to identify at least one vulnerability of the network by examining at least one of a node of the network, data transmission within the network, or data received from a cyber defense mechanism; a generation module configured to generate a cyber-attack based on the at least one vulnerability of the network, and a goal to be achieved by the cyber-attack; a penetration module configured to penetrate the network with the cyber-attack, and determine an effectiveness rating of the penetration; and a feedback module configured to provide a feedback to the identification module based on at least the effectiveness rating of the penetration.

A method for generating a cyber-attack to penetrate a network is disclosed. The method includes identifying at least one vulnerability of the network by examining at least one of a node of the network, data transmission within the network, or data received from a cyber defense mechanism; generating a cyber-attack based on the at least one vulnerability of the network, and a goal to be achieved by the cyber-attack; penetrating the network with the cyber-attack, and determining an effectiveness rating of the penetration; and providing a feedback to the identification module based on at least the effectiveness rating of the penetration.

A system for generating a cyber defense mechanism to secure a network is disclosed. The system includes a generation module configured to receive threat intelligence data, which provides information regarding cyber-attacks associated with the network, and generates the cyber defense mechanism to prevent against a cyber-attack associated with the threat intelligence data; a rating module configured to determine whether the cyber defense mechanism is successfully able to prevent the cyber-attack, and rate the cyber defense mechanism based on its effectiveness; and a feedback module configured to provide feedback to the generation module based on at least a rating of the effectiveness of the cyber defense mechanism.

A method for generating a cyber defense mechanism to secure a network is disclosed. The method includes receiving threat intelligence data, which provides information regarding cyber threats associated with the network; generating the cyber defense mechanism to prevent against a cyber-attack associated with the threat intelligence data; determining whether the cyber defense mechanism is successfully able to prevent the cyber-attack, and rating the cyber defense mechanism based on its effectiveness; and providing feedback to a receiving module based on at least a rating of the effectiveness rating of the penetration.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Aspects of the present disclosure provide a technical solution to the aforementioned problems associated with network security by providing fully automated techniques and systems driven by artificial intelligence (AI) models trained on malware samples, combinations of machine vulnerabilities and iteration to discover new attack vectors.

Network security, as described herein, can relate to the policies and practices adopted to prevent and monitor unauthorized access, misuse, modification, or denial of a network and network-accessible resources. Network security can involve the authorization of access to data in a network, which may be controlled by the network administrator. Network security can cover a variety of computer networks, both public and private, that are used in everyday jobs; conducting transactions and communications among businesses, government agencies and individuals. Networks can be private, such as within a company, and others which might be open to public access. Network security can be involved in organizations, enterprises, and other types of institutions.

A network, as used herein, can be a computer network, a data network, or a digital telecommunications network. The network can allow nodes operating in the network to share resources with each other using connections (data links) between nodes. These data links can be established over cable media, such as wires or optic cables, or wireless media (e.g., WiFi).

Figure 1:
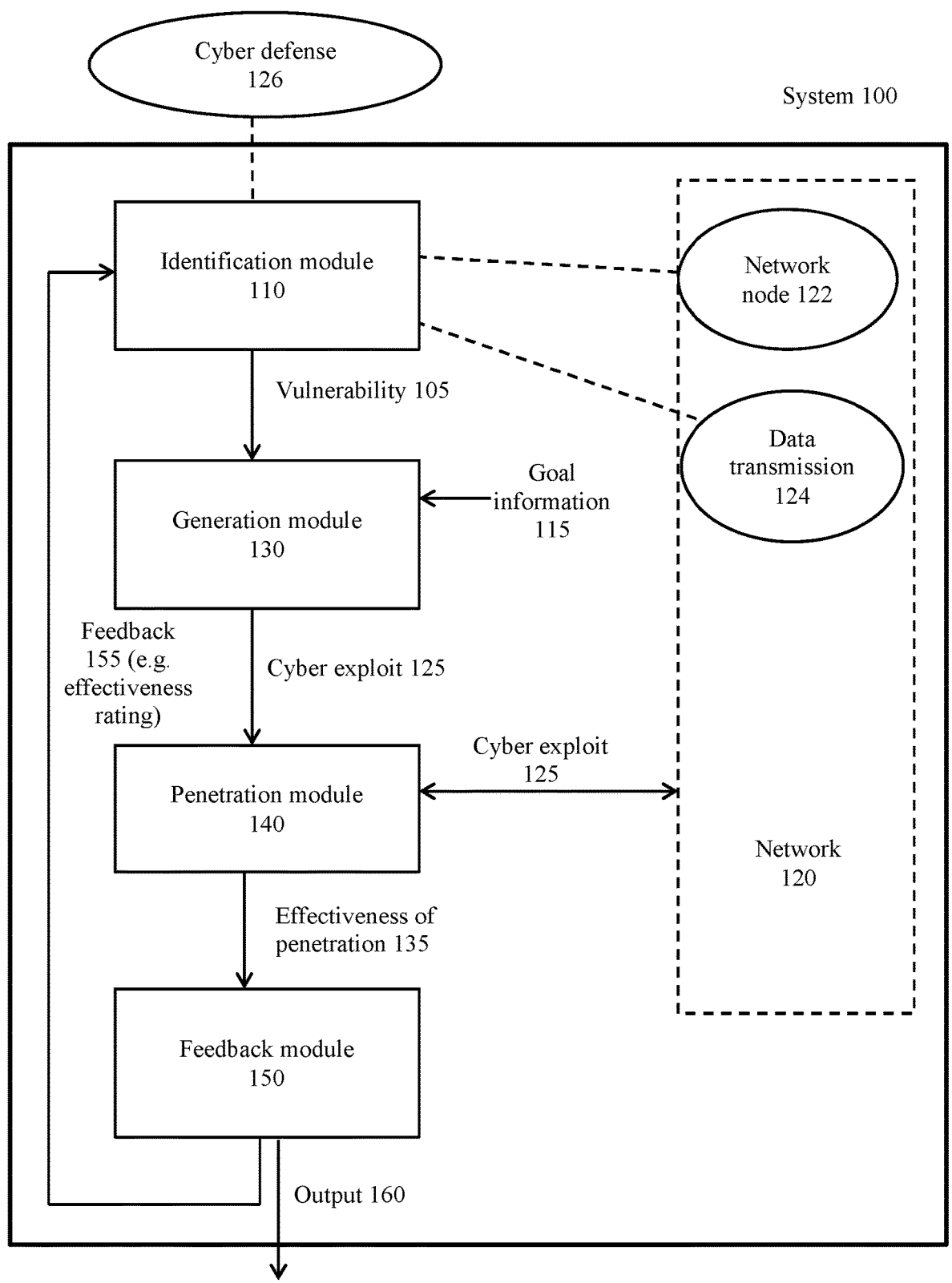
FIG. 1 illustrates an exemplary system for generating a cyber-attack to penetrate a network.

FIG. 1 shows an exemplary system 100 for generating a cyber-attack to penetrate a network. The system 100 can include an identification module 110 configured to identify at least one vulnerability 105 of the network 120 by examining at least one of a node (e.g., 122) of the network 120, data transmission 124 within the network 120, or data received from a cyber defense mechanism 126. That is, the vulnerability 105 can be identified by examining only one of the node 122, data transmission 124, or cyber defense mechanism 126, or a combination of any two, or a combination of all three of these data points.

In an exemplary embodiment, the vulnerability 105 can be identified by applying machine learning techniques (e.g., a neural network) on the data transmission 124 (e.g., email exchanges) within the network 120. For example, a neural network (or any other exemplary clustering and classification techniques, such as K-means and random forest) can be used to classify separately, for example, users/nodes who write about Information Technology on social media from those writing on "food-and-cats" topics. The latter group might be unaware of cyber threats and, therefore, more vulnerable.

In an exemplary embodiment, machine learning techniques (e.g., a neural network or any other exemplary clustering and classification technique such as SVM) can be applied to classify nodes (e.g., node 122) of the network 120 based on whether they click or access any malware embedded in emails or other information exchange. This provides an indication of vulnerability 105 because a user/node that clicks a malware link is more vulnerable than a user/node that ignores it.

The examining of a node (e.g., 122) and data transmission within the network 120 can include, but is not limited to, examinations of host credentials, scans of connected endpoints, root kit possibilities, back door possibilities, keywords in filenames, and vulnerabilities. Host credentials can include login information and/or operating system information. Particular keywords used in filenames can be susceptible to phishing attacks and other cyber-attacks.

Connected endpoints, as used herein, can be one or more nodes (e.g., 122) of the network 120. A node, as used herein, can be a redistribution point or a communication endpoint. The structure and functionality of the node can depend on the network and a protocol layer. A node can be a physical network node, which is an active electronic device attached to a network, capable of creating, receiving, or transmitting information over a communications channel. Examples of the node can include, but are not limited to, modem, hub, bridge or switch, or data terminal equipment (DTE) such as a digital telephone handset, a printer or a host computer.

Root kits, as used herein, can by any software designed to enable access to a computer or areas of its software that is not otherwise allowed (e.g., to an unauthorized user) and can mask its existence or the existence of other software.

Backdoor, as used herein, can be a method of bypassing normal authentication or encryption in a computer system, a product, or an embedded device (e.g., a home router), or its embodiment (e.g., as part of a cryptosystem, an algorithm, a chipset, or a "homunculus computer"—a tiny computer-within-a-computer, such as that as found in AMT technology). Backdoors can be used for securing remote access to a computer or obtaining access to plaintext in cryptographic systems. Backdoors may take the form of a hidden part of a program one uses, a separate program (e.g., Back Orifice may subvert the system through a rootkit), or code in the firmware of a hardware or parts of an operating system.

Vulnerabilities (e.g., 105) of a network, as used herein, can include one or more weaknesses that can be exploited by an attacker (e.g., system 100) to perform unauthorized actions within the network. These vulnerabilities can be caused by the complexity of large network systems, which can increase the probability of flaws and unintended access points. Using common, well-known code, software, operating systems, and/or hardware can also create vulnerabilities because an attacker has or can find the knowledge and tools to exploit flaws.

In an exemplary embodiment, vulnerabilities can also be caused by physical connections, privileges, ports, protocols, and services. A system's vulnerability increases with the more time each of those are accessible, or use of weak passwords that could be discovered by brute force, or storing passwords on a computer where an attacker program can access them.

In an exemplary embodiment, vulnerabilities can also be caused by fundamental operating system design flaws, such as when the operating system designer chooses to enforce suboptimal policies on user/program management. For example, operating systems with policies, such as default permit, grant every program and every user full access to the entire computer. This operating system flaw allows viruses and malware to execute commands on behalf of the administrator.

In an exemplary embodiment, vulnerabilities can originate from internet websites that contain harmful spyware or adware that can be installed automatically on the computer systems. After visiting those websites, the computer systems become infected and personal information can be collected and passed on to third party individuals. Vulnerabilities can originate from software bugs, such as a programmer leaving an exploitable bug in a software program allowing an attacker to misuse an application.

In an exemplary embodiment, vulnerabilities can also be caused from unchecked user input. That is, when a program assumes that all user input is safe. Programs that do not check user input can allow unintended direct execution of commands or SQL statements (known as buffer overflows, SQL injection or other un-validated inputs). The above described examples of vulnerabilities and their causes are non-limiting examples.

In an exemplary embodiment, the system 100 can include a generation module 130 configured to generate the cyber-attack 125 based on the at least one vulnerability 105 of the network 120, and a goal 115 to be achieved by the cyber-attack 125. A machine learning framework (e.g., a neural network) can be used to generate the cyber-attack 125, as described in detail herein.

In an exemplary embodiment, the vulnerability information 105 and the goal information 115 can be utilized by machine learning techniques to select the cyber-attack 125. A detailed example of such a machine learning technique (Recurrent Neural Network (RNN)) for generating/selecting automated "crowdturfing" cyber-attacks is described in AlphaGo Zero: Learning from scratch, provided at https://deepmind.com/blog/alphago-zero-learning-scratch/. This article is incorporated by reference herein.

The "Crowdturfing" attacks previously described are examples of many such cyber-attacks that can be selected/generated based on the vulnerability 105 and the goal information 115. Other cyber-attacks, for example, can be generated by applying machine learning techniques (e.g., a three-layer, fully-connected neural network) on the vulnerability 105 and the goal information 115, which can be based on an active number of processes running at various network nodes, an average amount of time between activity per user of a network, number of unique destination computers that a user connects to, ratio of a number of successful logins and total logins, type of authentication (e.g., NTLM, Kerberos), source types, and number of sources of the data.

In an exemplary embodiment, the goal 115 can vary depending on the type of approved activity for any given engagement with the goal focused on finding vulnerabilities that could be exploited by a nefarious actor. Examples of goals include, but are not limited to, network reconnaissance, distraction malware, creation of domain generation algorithm (DGA) nodes, creation of another command and control node, data exfiltration, encrypting things to "hide," deleting logs, wiping things, or installing ransomware. These goals are described in detail in the subsequent paragraphs.

In an exemplary embodiment, the cyber-attack 125 can be generated by combining/modifying known cyber-attacks based on the goal 115 to be achieved. For example, if the goal is to acquire sensitive/valuable information of an organization, the cyber-attack 110 can be generated by combining phishing with spear phishing and insider attack techniques, as follows. The cyber-attack 125 can first send a phishing email to any email account within an organization to harvest email credentials. Then, using the harvested email credentials, the cyber-attack 125 can send an email to someone in the same organization who has the power to provide valuable information (e.g., execute wire transfers).

Alternately, the generation module 130 can generate the cyber-attack 125 selecting from known cyber-attacks, e.g., cyber-attacks in the Common Vulnerabilities and Exposures (CVE) system, or the U.S. National Vulnerability Database, etc. For example, if the identification module 110 identifies the vulnerability 105 as easy remote access to a network, then the cyber-attack 125 (e.g., a malware for data exfiltration) can be selected to compromise user accounts on remote access applications using weak or manufacturers' default passwords.

In an exemplary embodiment, the cyber-attack 125 can include software, data, or a sequence of commands that takes advantage of a bug or vulnerability to cause behavior that is unintended or unanticipated by a system to occur on the system computer software, hardware, or network. Such behavior can include gaining control of a computer system, allowing privilege escalation, or a denial-of-service (DoS or related DDoS) attack. The unintended or unanticipated behavior can be identified by establishing a baseline of normal network behavior and then continuously monitoring the network for unusual events or trends, for example, the presence of a virus, bandwidth anomaly, connection rate anomaly, or payload anomaly for MAC Spoofing, IP Spoofing, TCP/UDP Fanout, IP Fanout, Duplicate IP, or Duplicate MAC.

In an exemplary embodiment, the cyber-attack 125 can include a remote exploit that works over a network to exploit the security vulnerability without any prior access to the vulnerable system. It can include a local exploit that requires prior access to the vulnerable system and increases the privileges of the person running the exploit over those granted by the system administrator. It can also include exploits against client applications, consisting of modified servers that send an exploit if accessed with a client application. The cyber-attack can be used first to gain low-level access, and then to escalate privileges repeatedly until it reaches the highest administrative level ("root").

In an exemplary embodiment, the cyber-attack 125 can originate from sources within and/or outside the network. It can be passive, where it intercepts data traveling through the network, or active where it initiates commands to disrupt the network's normal operation or to conduct network reconnaissance and lateral movement to find and gain access to assets available via the network. Network reconnaissance, as used herein, can include understanding the environment of a network, gathering information about the network so as to plan the attack approach, and fingerprinting the environment using appropriate techniques to prepare for the subsequent attack phases.

In an exemplary embodiment, the cyber-attack 125 can be used in computer and network surveillance, wiretapping, fiber tapping, port scan, idle scan, keystroke logging, screen scraping, backdoor, denial-of-service attack, spoofing, man-in-the-middle attack, man-in-the-browser attack, ARP poisoning, ping flood, ping of death, Smurf attack, buffer overflow, heap overflow, stack overflow, or format string attack.

In an exemplary embodiment, the cyber-attack 125 can be any type of offensive maneuver that targets computer information systems, infrastructures, computer networks, or personal computer devices. It can steal, alter, or destroy a specified target by hacking into a susceptible system, or install spyware on a computer. Examples of the cyber-attack 125 can include, but are not limited to, any mechanism to expose, alter, disable, destroy, steal or gain unauthorized access to, or make unauthorized use of, any data, device, or other component of the environment or network that supports information-related activities.

Malware, as used herein, can be any software that can cause damage to a computer, server or network. Malware can do damage after it is implanted or introduced in some way into a target node or network and can take the form of executable code, scripts, active content, and other software such as computer viruses, worms, Trojan horses, ransomware, spyware, adware, and scareware, among other types.

A DGA node, as used herein, can be a node using a DGA algorithm to periodically generate a large number of domain names that can be used as rendezvous points with its command and control nodes. Data exfiltration is any unauthorized movement of data that can occur by, for example, outbound emails, downloads to insecure devices, uploads to external devices, and/or unsecure behavior in the cloud. Ransomware can be malicious software from crypt virology that can threaten to publish data or perpetually block access to them. Ransomware can be carried out using a Trojan horse that is disguised as a legitimate file that the user is tricked into downloading or opening when it arrives as an email attachment.

In an exemplary embodiment, the generation module 130 is configured to vectorize information obtained by examining a node 122 of the network 120, data transmission 124 within the network 120, and data received from a cyber defense mechanism 126. For example, information obtained regarding various operating systems can be vectorized in the form of "Windows," "Linux," and "Mac," etc.

In an exemplary embodiment, the system 100 can include a penetration module 140 configured to penetrate the network 120 with the cyber-attack 125 and determine an effectiveness rating 135 of the penetration. The effectiveness rating 135 can be done on a rating scale (e.g., a Likert scale (1-10)), which can be a set of categories designed to elicit information about a quantitative or a qualitative attribute.

In an exemplary embodiment, a penetration of a network (e.g., 120) to evaluate the security of the network can be performed by a cyber-attack (e.g., 125) that includes an authorized, simulated attack on the network. The penetration can be performed in a virtual training environment, which can house a complete virtual enterprise network including, but not limited to, hosts, routers, switches, hubs, servers, and firewalls. Activity within the virtual training environment can replicate a network (e.g., a virtual network) and host usage to generate realistic network traffic. Alternately, the penetration described herein can be performed in a real environment (e.g., production/live environment).

In an exemplary embodiment, the virtual training environment can be fully customizable, allowing different known applications to be placed on any virtual infrastructure to replicate real enterprise defenses, as well as including Hardware in the Loop (HIL) for Apple, internet of things (IOT), printers or any other application that will make the environment realistic.

In an exemplary embodiment, the virtual training environment can be architected to capture all network traffic and label it as benign or malicious. The penetration can be performed to identify both vulnerabilities (e.g. 105), including the potential for unauthorized parties to gain access to the features and data of the network, as well as strengths, thus enabling a full risk assessment to be completed. The penetration of the network can be a "black box" penetration, such that prior information about the network is not known. This process can be fully automated and autonomous.

In an exemplary embodiment, the effectiveness rating 135 can be based on at least one of a success of the penetration (e.g., a phishing cyber-attack that gathers all the information would be rated higher than a phishing cyber-attack that gathers only some information) and the technique used for penetration (e.g., a simpler technique would be rated higher). Phishing attacks can be rated higher than DDoS/DoS attacks. A more complex or difficult goal to be achieved by the cyber-attack can be rated higher than a simpler or easier goal.

In an exemplary embodiment, the effectiveness rating 135 can be based on whether the cyber-attack 125 achieves its goal, partially or fully, the degree of persistence (e.g., unauthorized access that remains undetected for a longer period can have a higher degree of persistence and a higher corresponding effectiveness rating), success of a later movement that can be caused by the penetration, whether the cyber-attack achieved its goal "quietly" (e.g., if the network is unaware of a stealthy attack for a period of time that provides greater success for the activity of the penetration), whether the cyber-attack evaded a defense mechanism successfully, gain of any credential escalations (e.g., if the level of information accessed by the cyber-attack is highly classified), the types and quantity of data exfiltration, whether there was denial of service, and the distraction technique used for the penetration.

In an exemplary embodiment, the system 100 can include a feedback module 150 configured to provide a feedback 155 to the identification module 110 based on at least the effectiveness rating 135. The feedback 155 can include one or more of the effectiveness rating 135, network reconnaissance information, malware samples, cyber-attack lifecycle TTPs, states, rewards, actions, penalization, and other similar feedback data. The feedback module 150 can also provide an output 160 in the form of, for example, a malware report, or threat identification data (explained in detail herein).

In an exemplary embodiment, the identification module 110 can be configured to identify one or more vulnerabilities of the network 120 in addition to the already identified at least one vulnerability 105 by examining the feedback 155 received from the feedback module 150. This identification can be based on previously described techniques, or other similar techniques.

In an exemplary embodiment, the system 100 can be trained by examining the received feedback 155 through a scoring mechanism that either rewards or penalizes as it moves through the cyber-attack lifecycle, beginning with network reconnaissance covering each stage until the mission is complete. For example, if the effectiveness of a penetration 135 is higher than a given value, the scoring mechanism can reward that penetration by encouraging the system 100 to select/generate cyber-attacks that are same/similar to the particular exploit. Alternately, if the effectiveness of a penetration 135 is lower than a given value, the scoring mechanism can penalize that penetration by encouraging the system 100 to select/generate cyber-attacks that are different from the particular exploit.

In an exemplary embodiment, the system 100 can be driven by AI trained on malware samples, combinations of machine vulnerabilities and iteration to discover new attack vectors. The system 100 can be trained to conduct comprehensive network attacks including the use of metamorphic malware (e.g., malware capable of changing its code and signature patterns with each iteration). The system 100 can send varying forms of network attacks commensurate with network reconnaissance and discovered vulnerabilities.

In an exemplary embodiment, the system 100 can automatically and dynamically emulate specific cyber APT's (Advanced Persistent Threats) and TTPs (Tactics, Techniques and Procedures) to develop completely new combinations of attacks. The system 100 can leverage a combination of GANs (Generative Adversarial Networks) and Reinforcement Learning (RL), and continuously retrain as it tries different attack permutations using numerous inputs such as network reconnaissance, malware samples, malware report data, cyber-attack lifecycle TTPs, states, actions, rewards, penalizations and other data gathered.

In an exemplary embodiment, the system 100 can train through iteration, checks for successful exploitation, and recording any successful attempts. The system 100 can progress through cyber-attack in a step-wise fashion from initial compromise to lateral movement and subsequently delete log data.

In an exemplary embodiment, the system 100 can be only used for an authorized simulated attack on a network such that the index of the methodology used to exploit the network would be available. This methodology could then be downloaded as a report of a network's vulnerabilities.

Figure 2:
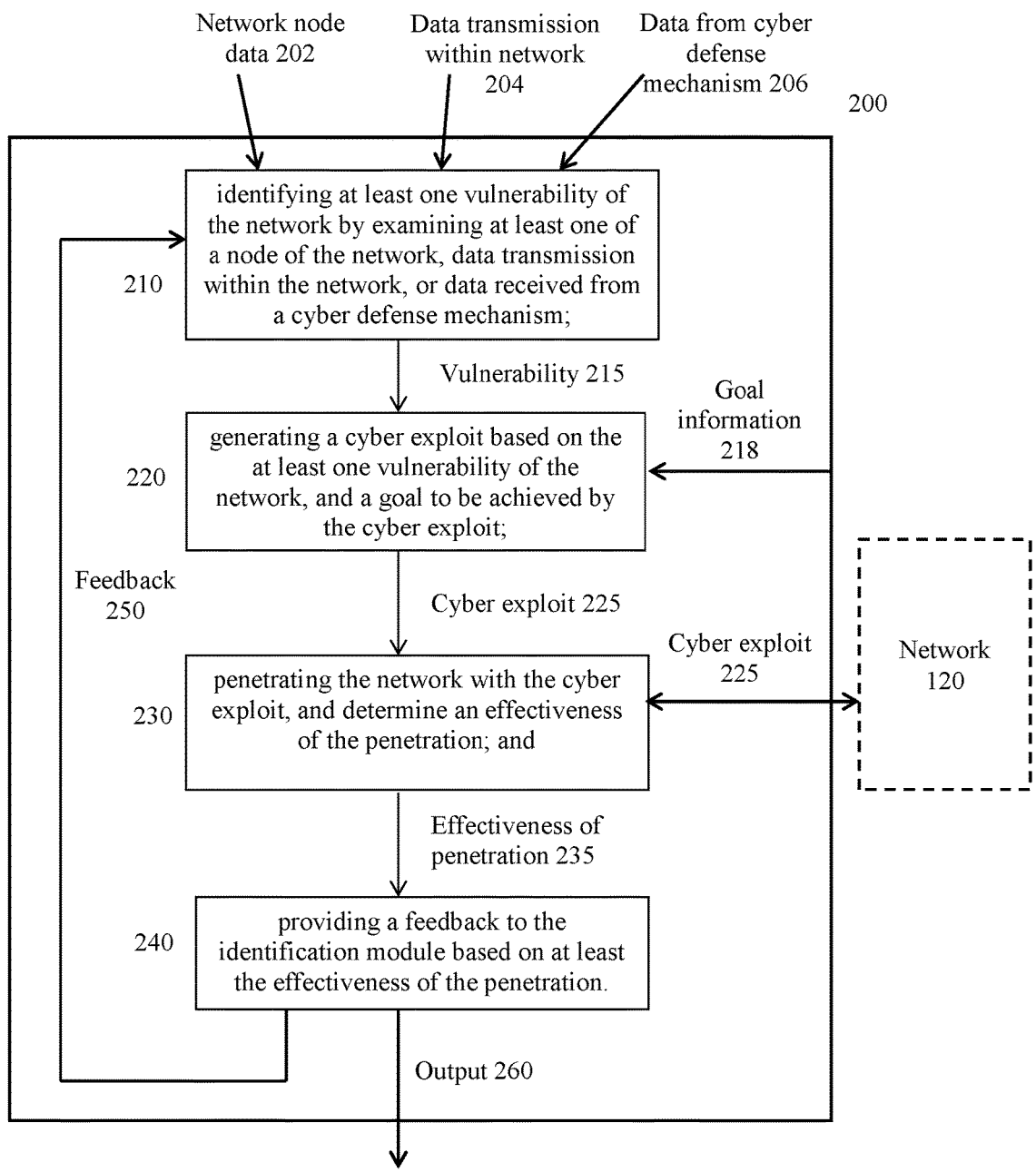
FIG. 2 illustrates exemplary node device architecture functions for implementing an embodiment of the present disclosure for generating a cyber-attack to penetrate a network.

FIG. 2 shows an exemplary method 200 that can be implemented by node device architecture(s) according to an embodiment of the present disclosure. Aspects of the method 200 can be based on the previously described system 100.

In an exemplary embodiment, the method 200 can include a step 210 of identifying at least one vulnerability 215 of the network by examining at least one of a node 202 of the network, data transmission 204 within the network, or data received from a cyber defense mechanism 206. Aspects of the identifying step 210 relate to the above discussion of the identification module 110.

In an exemplary embodiment, the method 200 can include a step 220 of generating a cyber-attack 225 based on the at least one vulnerability 215 of the network, and a goal 218 to be achieved by the cyber-attack. Aspects of the generating step 220 relate to the above discussion of the generation module 130.

In an exemplary embodiment, the method 200 can include a step 230 of penetrating the network with the cyber-attack 225, and determining an effectiveness of the penetration 225. Aspects of the penetrating step 230 relate to the above discussion of the penetration module 140.

In an exemplary embodiment, the method 200 can include a step 240 of providing a feedback 250 based on at least the effectiveness of the penetration 225. Aspects of the feedback step 240 relate to the above discussion of the feedback module 150. The feedback step 240 can also include providing an output 260 in the form of, for example, a malware report, or other such data.

Figure 3:
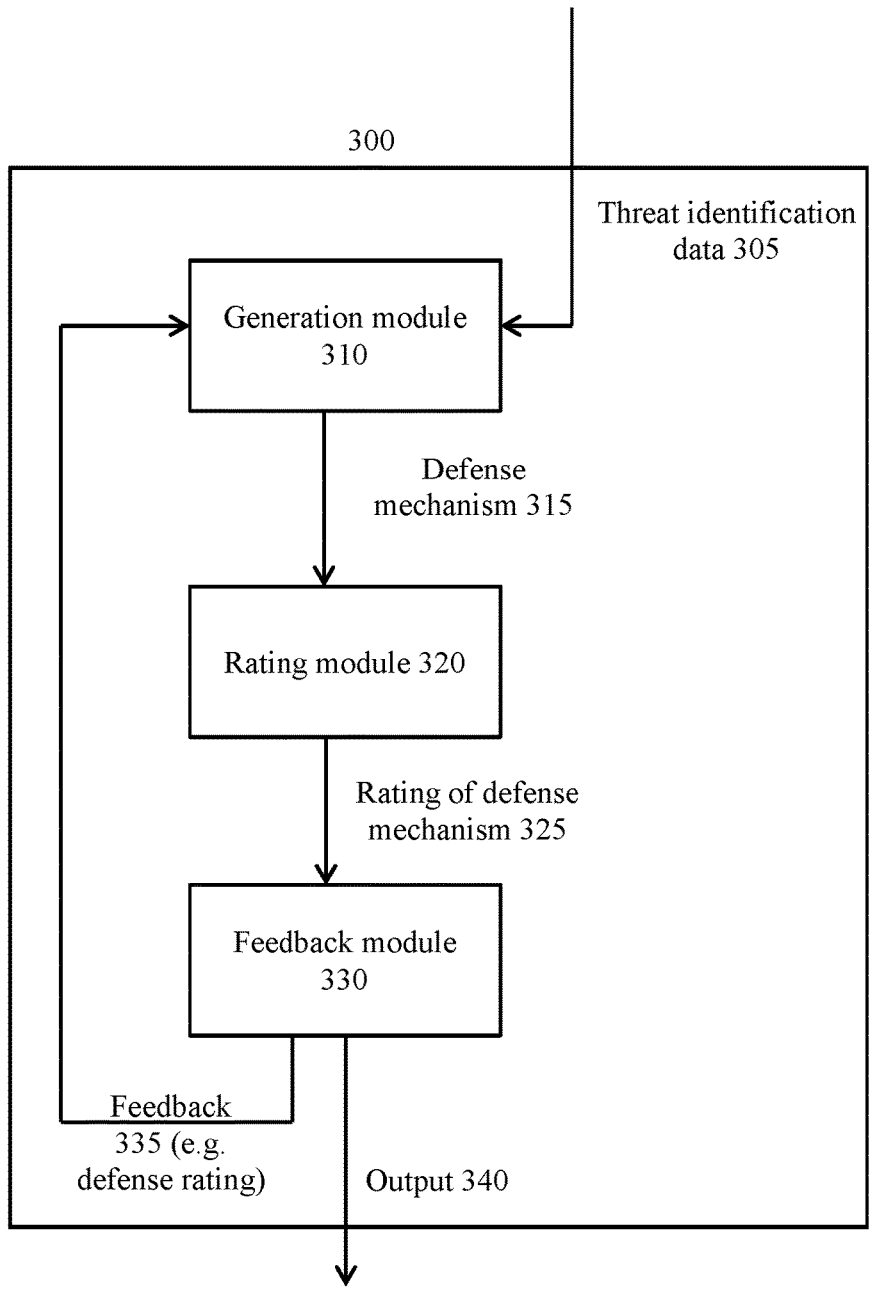
FIG. 3 illustrates an exemplary system for generating a cyber defense mechanism to secure a network.

FIG. 3 shows an exemplary system 300 for generating a cyber defense mechanism to secure a network. Cyber defense mechanism, as used herein, can include responses to penetrations or other threat actions and critical infrastructure protection and information assurance mechanisms for networks. Cyber defense mechanism can focus on preventing, detecting, or providing timely responses to attacks or threats so that no infrastructure or information is tampered with or accessed without authorization. The system 300 can be either set to reinforcement learning or utilized to deploy already created algorithms to determine viability in a dynamic environment.

In an exemplary embodiment, the system 300 can include a generation module 310 configured to receive threat intelligence data 305, which provides information regarding cyber-attacks associated with the network. For example, an active number of processes running at a node can reflect an abnormally high number of active processes within a given time period. The generation module 310 can be configured to generate a cyber defense mechanism 315 to prevent against a cyber-attack associated with the threat intelligence data 305. The threat intelligence data 305 can be received from a source internal to the system 300 or an external source, such as the system 100.

The defense mechanism 315 can be generated by utilizing machine learning techniques that can leverage different types of data and use machine learning to make decisions about the threat level, indicators of compromise and threat intelligence to make a decision on blocking tactics. For example, the paper titled "Malware Detection by Eating a Whole EXE" by Raff et al. describes machine learning techniques, such as neural networks among others, to generate a defense mechanism 315 to respond to threat intelligence data 305 in the form of intrusions. The paper is incorporated by reference herein. Another example is provided in the paper titled "Learning the PE Header, Malware Detection with Minimal Domain Knowledge" by Raff et al. The paper is incorporated by reference herein.

The system 300 can include a rating module 320 configured to determine whether the defense mechanism 315 is successfully able to prevent a cyber-attack (e.g., from system 100) and rate the defense mechanism 315 based on its effectiveness. For example, the rating of the effectiveness of the defense mechanism 325 can depend on its ability to detect a cyber-attack, actively block an attack, quarantine host computers, dynamically create a honeypot, kill certain host processes, etc.

In an exemplary embodiment, the rating of the defense mechanism 325 can depend on a complete or partial success of the defense mechanism 315. For example, if the defense mechanism 315 is fully successful in thwarting an attack, the rating could be 1 in a scale of 0 to 1. The rating would be 0 if the mechanism 315 is unable to stop any aspect of an attack.

In an exemplary embodiment, the rating of the defense mechanism 325 can depend on a technique used by the defense mechanism 315. For example, if a simpler machine learning model (e.g., that uses fewer network resources) is used to thwart an attack, then the rating 325 could be higher. A defense mechanism (e.g., 315) using a machine learning model that employs a large number of network resources would have a lower rating 325. Similarly, a proactive technique would be rated higher than a reactive technique.

In an exemplary embodiment, the rating 325 can be based on whether the cyber defense mechanism 315 achieves its goal, partially or fully. Examples of goals can be quarantining the compromised network node from the network using, for example, network routers and switches that control the access of the node to the network, or partially/completely shutting down the network, logging the cyber-attack information, etc. The closer the defense mechanism 315 is to its goal, the higher its rating. For example, if the goal of the defense mechanism 315 is regression analysis, a clustering machine learning model (e.g., K means) can have a lower rating than a supervised learning model (e.g., Support Vector Machine).

The system 300 can include a feedback module 330 configured to provide feedback 335 to the generation module 310 based on at least the defense rating 325. The feedback 335 can also include data necessary for training/re-training the system 300 (e.g., network traffic data, netflow, logs, host, sysmon, system memory data). For example, the feedback 335 can include network traffic information associated with a certain type of defense mechanism such that if similar network traffic information is encountered again, the defense mechanism can automatically defend the network by, for example, locking down ports, blocking IPs at a firewall, etc. The feedback module 330 can also provide an output 340 in the form of, for example, a malware report, attack report, etc.

In an exemplary embodiment, the cyber defense mechanism 315 can be a combination of multiple defense mechanisms, each cyber defense mechanism being configured to thwart a part of the cyber-attack. For example, the cyber defense mechanism 315 can include a defense mechanism (e.g., quarantining a network node) if part of the attack is malware, and a different defense mechanism (e.g., logging the cyber-attack information) if part of the attack is spyware. In such a case, the rating 325 can be based on a combination (e.g., average or weighted average) of the effectiveness of each cyber defense mechanism to thwart a respective part of the cyber-attack.

The system 300 can be used for detecting network threats and identifying attacks within a network. After experiencing various and numerous types of threats in a simulated environment, the system 300 can be deployed in enterprise networks by itself to help identify threats.

In an exemplary embodiment, the system 300 can also work in concert with a visualization mechanism to dynamically ingest streaming network traffic, create necessary features, make early prediction of threats, and send the suspicious information through a data enrichment program before arriving at the visualization mechanism. When integrated with the system 300, the visualization mechanism can allow a user to view devices and connections within the network that contain indications of infection or vulnerability as identified by the system 300. The threat level can be automatically labeled, and tentative network context can be provided.

In an exemplary embodiment, a visualization mechanism can allow a user to interact with the network map to relabel data which, in turn, can aid in the continuous retraining of the system 300. This retraining can validate the recommendations of the system 300. As the labels are provided to the system 300, it can learn the unique complexities of the network to reduce false positives over time.

As the system 300 is able to make predictions at the cyber edge, it can be deployed independently after it has been trained in the simulated environment or in tandem with a visualization mechanism. The system 300 can be used as a detection mechanism for enterprise threat, or it can operate using streaming data and can be forward deployed at the sensor level within the network.

Figure 4:
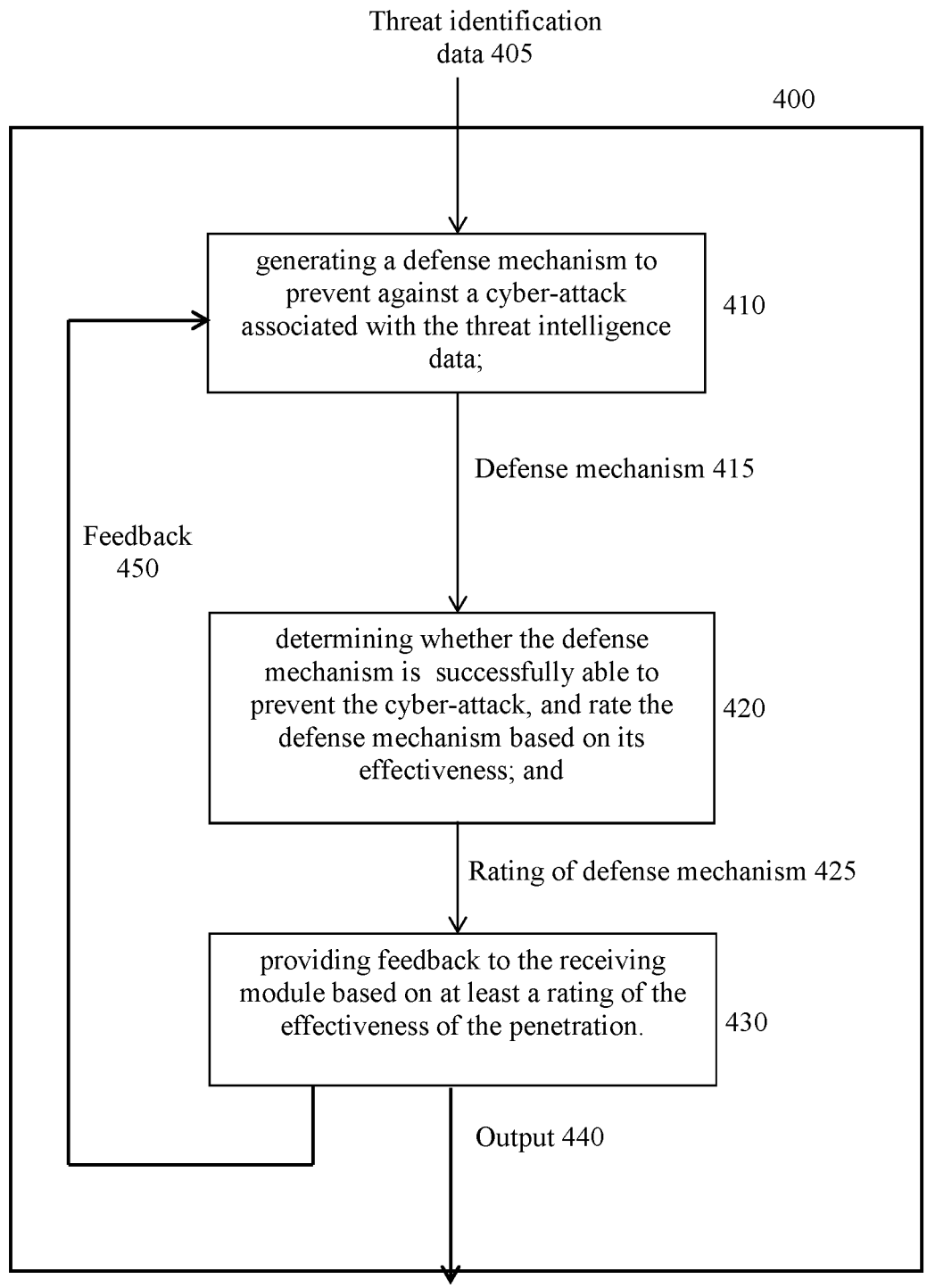
FIG. 4 illustrates exemplary node device architecture functions for implementing an embodiment of the present disclosure for generating a cyber defense mechanism to secure a network.

FIG. 4 shows an exemplary method 400 that can be implemented by node device architecture(s) according to an embodiment of the present disclosure. The method 400 can include a step 410 of receiving threat intelligence data 405, which provides information regarding cyber threats associated with the network; and generating a cyber defense mechanism 415 to prevent against a cyber-attack associated with the threat intelligence data 405. Aspects of the step 410 relate to the previous discussion of the generation module 310.

In an exemplary embodiment, the method 400 can include a step 420 of determining whether the cyber defense mechanism 415 is successfully able to prevent the cyber-attack, and rating 425 the cyber defense mechanism 415 based on its effectiveness. Aspects of the step 420 relate to the previous discussion of the rating module 320.

In an exemplary embodiment, the method 400 can include a step 430 of providing a feedback 450 to the generation module 410 based on at least the rating 425. Aspects of the step 430 relate to the previous discussion of the feedback module 330.

Figure 5:
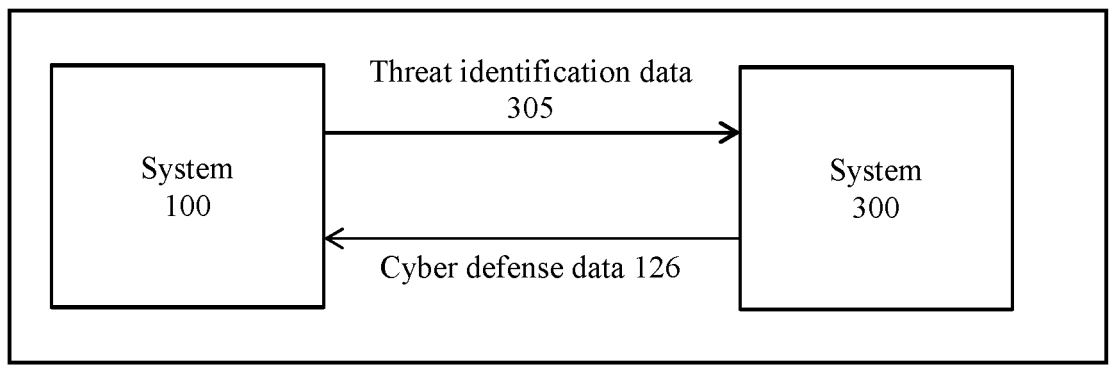
FIG. 5 illustrates an exemplary high-level system diagram according to an embodiment of the present disclosure.

FIG. 5 illustrates a system 500 that shows an exemplary interaction between the system 100 and system 300. In an exemplary embodiment, the system 100 can provide the output 160 (e.g., in a form of threat identification data 305) to the system 300. Alternately, the system 300 can provide the output 340 (e.g., in a form of cyber defense data 126) to the system 100. In yet another exemplary embodiment, both the system 100 and system 300 can provide each other with the outputs 160 and 340 respectively.

In an exemplary embodiment, a modification of the visualization mechanism can be used as a control interface for a virtual environment simulator of the system 500 to train both the system 100 and the system 300. The training can be scenario-based and linear, and can depend on developed content that emulates real-world events before the virtual environment simulator of the system 500 is released into a cyber range to train on.

In an exemplary embodiment, the virtual environment simulator of the system 500 can accelerate the training of cyber operators by using the system 100 and system 300 as active adversaries that provide end-to-end training in a dynamic, asymmetric simulation that increases in complexity. The simulator of the system 500 can "play" either system 100 or system 300 as an opponent that has been specifically trained to emulate certain cyber operations. In such a scenario, the system 100 can be trained to emulate a specific APT by re-training it on collected APT samples. Whereas, the system 300 can actively defend the network against detected threats. The system 500 can also replay an entire training simulation to review TTPs and how they could be improved.

In an exemplary embodiment, the virtual environment simulator of the system 500 can be utilized by the system 100 and system 300 to obtain a higher level of quality by providing complex attacks and scenarios that emulate real-world APT tactics, techniques and procedures. Malware samples of APTs can be necessary to emulate the TTPs but the training environment can be controlled by allowing replaying of the entire training simulation.

In an exemplary embodiment, the interplay of the system 100 and the system 300 as illustrated in the system 500 can lead to hardening of the defense mechanism of the system 300 because it will be able to train on a continuous stream of new attack vectors generated by the system 100. This can in turn make the system 100 more effective because it would be forced to discover new methods of attacking the system 300, as the earlier methods cease to work.

Therefore, the pairing of the system 300 with the system 100 can allow for the autonomous design of enterprise networks that have been successfully defended against a dynamic actor even before being pushed to production. Utilizing AI from a reinforcement learning approach can enable a deployment of a network architecture that can be continuously and automatically hardened over time.

New network designs, new layouts and more efficient designs that save money and provide defense in depth can be developed by the simulated environment, which provides end-to-end training in a dynamic, asymmetric simulation that increases in complexity. For example, the combination of the system 500, and the virtual environment orchestrated together can facilitate an "AI-driven network hardening tool" that can be tested for vulnerabilities and automatically hardened to standards given certain constraints (e.g., a network with 1000 nodes of Windows 10 with Norton, deploy a virtual environment on the network, and harden the network).

As a new network layout is designed, deployed and attacked in a simulation environment based on systems 100 and 300, enterprise network architects can have a validated network architecture that has been penetration-tested prior to being deployed to the real world. The resulting architecture can be recorded in a devops file that can be readily deployed in production.

The virtual environment changelogs can provide an output for Enterprise Architects of efficient, enterprise scale network diagrams that have been hardened by the system 100 and the system 300. This output can allow for automatic network designs that could save time and money by first simulating an enterprise network within a virtual environment.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system, as used herein, can be in combination with one or more nodes, wherein the system resides in the one or more nodes. A node can be configured to interface or contain one or more components of the systems described herein.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A system for generating a cyber-attack to penetrate a network, the system comprising:
    an identification module configured to identify at least one vulnerability of the network by examining at least one of: a node of the network; data transmission within the network; or data received from a cyber defense mechanism;
    a generation module configured to generate a cyber-attack based on the at least one vulnerability of the network, and a goal to be achieved by the cyber-attack, wherein the generation module utilizes one or more machine learning techniques to generate the cyber-attacks;

a penetration module configured to penetrate the network with the cyber-attack, and determine an effectiveness rating of the penetration; and in response to determining the effectiveness rating of the penetration is higher than a preconfigured value, a scoring mechanism rewards the penetration by configuring the system to generate cyber-attacks that are same as a particular exploit;

in response to determining the effectiveness rating of the penetration is lower than a preconfigured value, the scoring mechanism penalizes that penetration by configuring the system to generate cyber-attacks that are different from the particular exploit; and a feedback module configured to provide a feedback to the identification module based on at least the effectiveness rating of the penetration;

wherein the identification module is configured to identify one or more vulnerabilities in addition to the at least one vulnerability of the network by examining the feedback received from the feedback module.

2. The system of claim 1, wherein the cyber defense mechanism is configured to automatically defend the network using a single defensive mechanism or a combination of defensive mechanisms.

3. The system of claim 1, wherein the feedback module is configured to provide the feedback to the cyber defense mechanism.

4. The system of claim 3, wherein the cyber defense mechanism forms a part of a system for generating a cyber defense mechanism to secure a network.

5. The system of claim 1, wherein the identification module utilizes one or more machine learning techniques to identify the at least one vulnerability of the network.

6. The system of claim 1, wherein the effectiveness rating of the penetration is based on at least one of: a success of the penetration; a technique used for penetration; or the goal to be achieved by the cyber-attack.

7. The system of claim 1, in combination with one or more nodes, wherein the system resides in the one or more nodes.

8. The system of claim 1, compromising:
the node of the network, the node configured to interface with or contain one or more of the identification module, the generation module, the penetration module, or the feedback module.

9. A method for generating a cyber-attack to penetrate a network, the method comprising: identifying at least one vulnerability of the network by examining at least one of: a node of the network; data transmission within the network; or data received from a cyber defense mechanism;

generating a cyber-attack based on the at least one vulnerability of the network, and a goal to be achieved by the cyber-attack, wherein the generation module utilizes one or more machine learning techniques to generate the cyber-attacks;

penetrating the network with the cyber-attack, and determining an effectiveness rating of the penetration; and in response to determining the effectiveness rating of the penetration is higher than a preconfigured value, a scoring mechanism rewards the penetration by configuring the system to generate cyber-attacks that are same as a particular exploit;

in response to determining the effectiveness rating of the penetration is lower than a preconfigured value, the scoring mechanism penalizes that penetration by configuring the system to generate cyber-attacks that are different from the particular exploit; and providing a feedback based on at least the effectiveness rating of the penetration; and identifying one or more vulnerabilities in addition to the at least one vulnerability of the network by examining the feedback.

10. The method of claim 9, comprising:
iterating any one or combination of the steps of identifying at least one vulnerability, generating a cyber-attack, penetrating the network with the cyber-attack, providing a feedback, or identifying one or more vulnerabilities.

11. A system for generating a cyber defense mechanism to secure a network, the system comprising:

a generation module configured to receive threat intelligence data, which provides information regarding cyber-attacks associated with the network, and generate the cyber defense mechanism to prevent against a cyber-attack associated with the threat intelligence data, wherein the cyber defense mechanism utilizes one or more machine learning techniques to generate the cyber defense;

a rating module configured to determine whether the cyber defense mechanism is successfully able to prevent the cyber-attack, and rate the cyber defense mechanism based on its effectiveness; and in response to determining the effectiveness rating of the cyber defense, a high rating is computed based on usage of network resources, and defense mechanism goal;

in response to determining the effectiveness rating of the cyber defense, a low rating is computed based on usage of the machine learning technique; and a feedback module configured to provide feedback to the generation module based on at least a rating of the effectiveness of the cyber defense mechanism; and an identification module configured to identify one or more vulnerabilities by examining the feedback received from the feedback module.

12. The system of claim 11, wherein the generation module is configured to receive the threat intelligence data from the feedback module.

13. The system of claim 11, wherein the effectiveness rating of the cyber defense mechanism is based on at least one of: a success of the cyber defense mechanism; or a technique used for the cyber defense mechanism.

14. The system of claim 11, wherein the feedback module is configured to provide the feedback to a system for generating a cyber-attack.

15. The system of claim 11, wherein the cyber defense mechanism forms a part of a system for generating a cyber defense mechanism to secure a network.

16. The system of claim 11, in combination with one or more nodes, wherein the system resides in the one or more nodes.

17. The system of claim 11, wherein the cyber defense mechanism is a combination of multiple cyber defense mechanisms, each cyber defense mechanism being configured to thwart a part of the cyber-attack.

18. The system of claim 17, wherein the effectiveness of the cyber defense mechanism is based on a combination of the effectiveness of each cyber defense mechanism to thwart a respective part of the cyber-attack.

19. The system of claim 11, compromising:
a network node configured to interface with or contain one or more of the generation module, the rating module, the feedback module, or the identification module.

20. A method for generating a cyber defense mechanism to secure a network, the method comprising:
- receiving threat intelligence data, which provides information regarding cyber threats associated with the network;
- generating the cyber defense mechanism to prevent against a cyber-attack associated with the threat intelligence data, wherein the cyber defense mechanism utilizes one or more machine learning techniques to generate the cyber defense;
- determining whether the cyber defense mechanism is successfully able to prevent the cyber-attack, and
- rating the cyber defense mechanism based on its effectiveness; and
- in response to determining the effectiveness rating of the cyber defense, a high ratings is computed based on usage of network resources, and defense mechanism goal;
- in response to determining the effectiveness rating of the cyber defense, a low rating is computed based on usage of the machine learning technique; and
- providing feedback based on at least a rating of the effectiveness rating of the penetration; and
- identifying one or more vulnerabilities by examining the feedback.

21. The method of claim 20, comprising:
- iterating any one or combination of the steps of receiving threat intelligence data, generating the cyber defense mechanism, determining whether the cyber defense mechanism is successfully able to prevent the cyber-attack, providing feedback, or identifying one or more vulnerabilities.

\* \* \* \* \*